March 18, 1969 E. G. LUNDIN ET AL 3,433,359

INSTALLATIONS FOR THE PURIFICATION OF LIQUIDS

Filed Jan. 18, 1968

United States Patent Office 3,433,359
Patented Mar. 18, 1969

3,433,359
INSTALLATIONS FOR THE PURIFICATION OF LIQUIDS
Eric Gustaf Lundin, Strangnas, and Ernst Arne Rubin, Lund, Sweden, assignors to AB Purac, Lund, Sweden, a corporation of Sweden
Filed Jan. 18, 1968, Ser. No. 698,944
U.S. Cl. 210—199
Int. Cl. B01d 23/24, 23/16, 23/02
6 Claims

ABSTRACT OF THE DISCLOSURE

Apparatus for purifying liquids by a combination of flotation and filtration which includes a flotation basin disposed above a filtration bed of granular material. Means are provided for injecting a liquid containing dissolved gas into the flotation basin immediately adjacent the upper surface of the granular filtration bed so that sedimentation of impurities on the filtration bed is markedly reduced while providing effective flotation in said basin. Periodically the flow of liquid to be purified is reversed, so as to remove accumulated impurities from the filtration bed and to enable removal of impurities floating on the liquid in the flotation basin.

---

Figure 1:
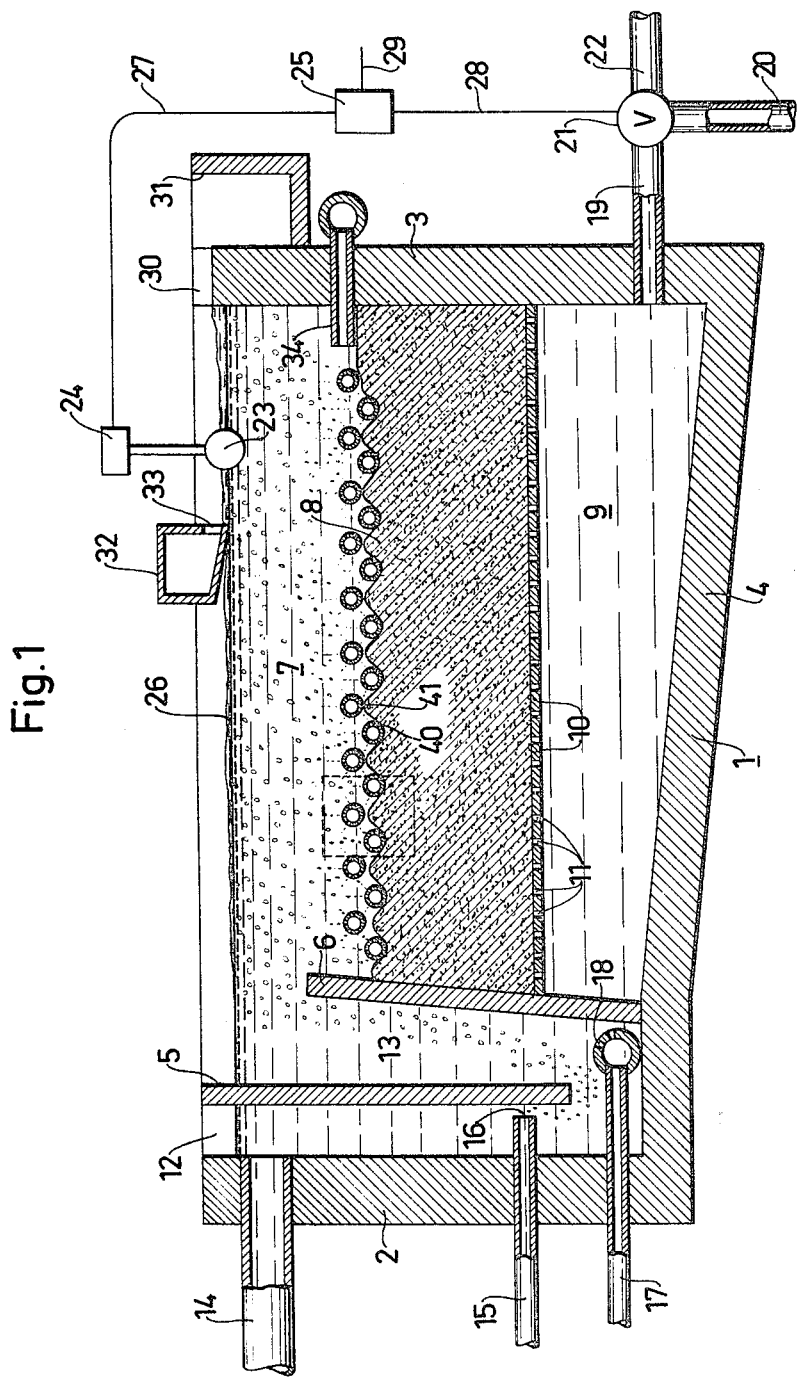

The present invention relates to the purification of water and in this regard concerns an installation for the high grade purification of a liquid by means of a serially connected flotation and filtration method, wherein a flotation basin and a sand filter are included.

Both flotation and filtration methods have for a long time been applied to the purification of water and are for this purpose mainly used when high purification power of the system applied is required. The flotation is carried out in a flotation basin, wherein the impurities floated out collect as a scum on the surface of the liquid, whereupon the scum is removed by scoops or with the aid of suction means. The flotation basin may be of various shapes, but those generally used are cylindrical or rectangular. In the case of filtration methods the purification process is likewise carried out in a basin provided for the purpose, that is to say a filtration basin in which when sand filters are used the filter is disposed on a filter bed.

Neither flotation nor filtration methods can generally be carried out entirely continuously, or at least this is true of filtration methods. In order to be able to work satisfactorily the sand filter must therefore occasionally be cleaned. In addition, the scum collecting on the surface of the flotation basin must be removed. According to the invention it is made possible in a simple manner to combine a flotation unit and a filtration unit. According to the invention this is achieved by constructing the bottom of the flotation basin as a sand filter. Apart from the fact that in an installation constructed in this manner intervention required during the continuous operation can be reduced to a minimum desirable for technical reasons, and that in addition operation is made less expensive, the cost of the installation can furthermore be very substantially reduced. This reduction of installation costs is achieved through the fact that the flotation and filtration basins are one and the same, that is to say only one of the expensive outer basins is required.

If the liquid is allowed to flow through the filter in a direction opposite to that employed for filtration, the filter is very effectively freed of the impurities which have collected in it. During the period of time required by this cleaning operation it is naturally not possible to filter. Since in addition considerable quantities of purified water are needed for the cleaning, it is desirable to reduce to a minimum the number of filter cleaning operations per unit of time. It has been shown that most of the impurities collect in the upper layer during filtration. This fact has been utilised in a further development of the present invention, according to which devices are incorporated which keep the uppermost layer continuously or intermittently in movement, thereby counteracting or entirely preventing the accumulation of impurities in the outer layer. The intervals between the more thorough cleaning operations can thus be lengthened. The invention is therefore further characterised in that a spray device is disposed directly above the surface of the sand filter.

Figure 2:
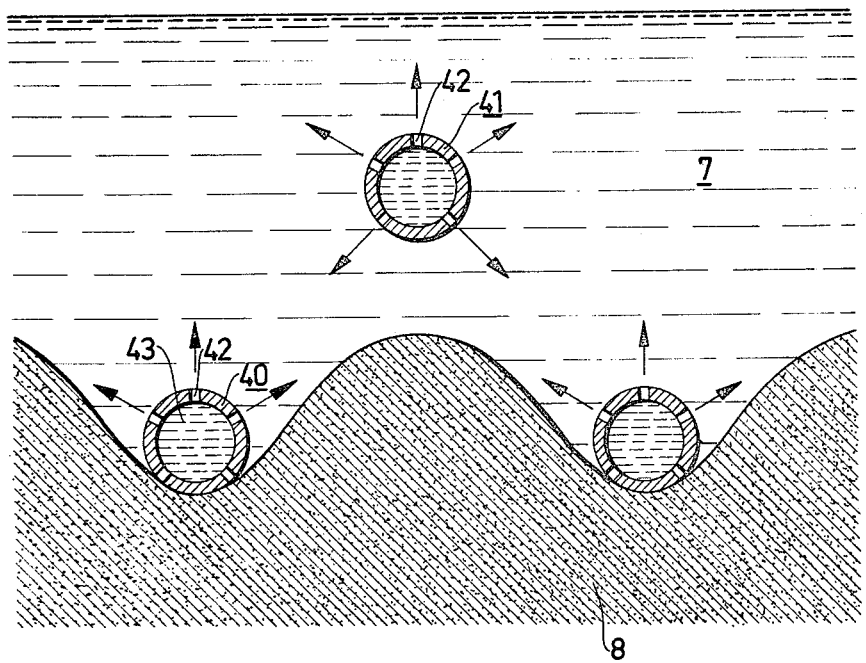

Further characteristics and advantages of the present invention will be seen from the following examples of its embodiment, which are described with reference to the accompanying drawings, in which FIGURE 1 shows a longitudinal section through a preferred embodiment of the invention, while FIGURE 2 illustrates a detail on a larger scale.

The installation illustrated comprises a vessel 1 which has a front wall 2, a rear wall 3, an inclined bottom 4 (and also side walls, not illustrated). Between a down shaft 12 and a rising shaft 13 is disposed a wall 5. The rising shaft 13 is in addition bounded by a wall 6. The upper portion of the installation consists of the flotation part 7. Beneath the flotation part 7 there is situated a sand filter 8 which rests on a filter bed 10 provided with a large number of apertures 11. The space 9 between the filter bed 10 and the inclined bottom 4 serves as pure water sump. A supply pipe 14 for soiled or flocculated water is connected to the top of the down shaft 12 and in the bottom part of the latter there is disposed a flotation medium supply pipe 15, the mouth 16 of which is situated a prearranged distance from the wall 5, being so adjusted that the speed of flow of the flotation medium is damped against the wall. The flotation medium may, for example, consist of an air-water dispersion. Instead of, or additionally to, this arrangement a flotation medium spray may be disposed in the transition between the down and rising shafts, said spray being in the form of a nozzle 18 which is connected to a flotation medium pipe 17.

The opposite side 3 of the installation contains the purified water outlet 19 which is connected by way of a regulating valve 21 to an outlet pipe 20. In order to achieve the back-pressure necessary for cleaning the sand filter, a pressure pipe 22 is connected to the regulating valve 21. The pressure can be obtained with the aid of a pump, not illustrated.

In FIGURE 1, a number of pipes 40 and 41 are disposed in two layers and are provided with a large number of apertures 42 in their peripheries, as can be seen from FIGURE 2. The bottom layer of pipes, that is to say the pipes 40, are partly embedded in the filter, while the upper layer, that is to say the pipes 41, are situated slightly above the surface of the sand filter.

The liquid level 26 is sensed by a float or other level regulator 23, which by means of a liquid level signal transducer 24 reproduces the value of the instantaneous height of liquid, said value being transmitted as a signal through the cable 27 to a control unit 25. The control unit 25 contains devices for regulating the valve which is partly dependent on the level 26 and partly on a programme control means. In addition, the control unit 25 contains a device for closing the regulating valve 21 and for switching on the pressure generating pump, not illustrated, at the moment when the liquid level 26 has to be raised for the purpose of separating the outer scum and the sand filter 8 has to be cleaned. This timing may also be governed by the programme control means disposed in the control unit 25. For the purpose of transmitting commands to the regulating valve 21, a command cable 28 is provided, while for the purpose of transmitting commands to the pressure generating pump, not illustrated, use is made of the command cable 29.

The top portion of the rear wall 3 is slightly lowered in relation to the other walls of the vessel 1, so that an aperture 30 is provided for the surface scum. Beneath said aperture there is provided a trough 31 to receive the scum. Instead of this aperture 30 and this trough 31, a scum and flushing trough 32 having an opening 33 may be mounted above the liquid surface 26.

Finally, devices 34 for running off water which has undergone flotation treatment but not filtration are incorporated. These devices may be used in flotation alone appears to be adequate to meet the requirements in respect of purity, in which case the sand filter 8 need not be used. If the filter is used for high grade purification, the device 34 may optionally also be utilised for running off purposes in instances for which high grade purification is not necessary.

The devices illustrated work in the following manner: The water which is to be purified enters the shaft 12 through the supply pipe 14. The impurities are then flocculated by the addition of a flocculating agent to the water. The soiled water flows downwards through the shaft 12 and in the bottom portion of the latter encounters the flotation medium flowing through the opening 16. Since the distance between the mouth 16 of the supply pipe and the wall 5 is suitably determined, the speed of the dispersion or flotation medium is damped against the wall, so that thereupon at least a part flows up along said wall 5 and is gradually intimately mixed with the soiled water flowing down. Instead of or additionally to this arrangement, the flotation medium may be supplied through the nozzle 18.

On its path through the rising shaft 13 the air dissolved in the water and introduced by the dispersion is formed into small air bubbles in consequence of the reduction of pressure. These bubbles tend to form on the particles of dirt contained in the water, to adhere firmly thereto, and consequently to carry them to the surface by buoyancy. When the liquid in the flotation basin 7 moves to the more remote part, that is to say to the right in FIG. 1 of the drawings, and the flocculated impurities are raised to the surface by the air bubbles, a layer of impurities is gradually formed on the liquid surface 26 mainly in the more remote part of the basin.

The liquid purified in this manner is subjected to a further purification process by being filtered through the sand filter 8. It is thereby freed from impurities which were not removed by the flotation process. The purified water collects in the pure water sump 9, from which it is drawn off through the pipe 19 and passed to an outlet through the valve 21 and the pipe 20.

Except when the impurities floating on the surface are to be removed, the liquid level 26 should be kept at a uniform height. This can be achieved by adjusting the regulating valve 21 so that the opening between the pipes 19 and 20 is adjusted to the level of liquid. For this purpose use is made of a level sensing means (illustrated as a float in the drawings), which by means of suitable transmission devices controls the valve openings in dependence on the liquid level. The transmission devices may be of various types, for example mechanical, pneumatic, hydraulic, or electrical. The drawings thus illustrate a liquid level signal transducer 24 which through the cable 27 transmits to the control unit 25 a signal proportional to the instantaneous liquid level 26. In the control unit this signal is converted into a command which by means of the command cable 28 adjusts the valve 21 so that a suitable opening is formed between the pipes 19 and 20.

At prearranged times the surface scum accumulating on the surface 26 is removed. These times are determined by a programme control means provided in the control unit 25. At the times which are thus determined by the aforesaid programme control means, the control unit 25 thus transmits a command which through the command pipe 28 controls the regulating valve 21 in such a manner that communication between the pipes 19 and 20 is entirely suppressed. The supply of soiled water continues in the meantime, so that the level 26 is raised above the height of the aperture 30 or to the height of the opening 33 in the scum trough 32. In consequence of the hydrostatic pressure of the surface layer, all the accumulated scum together with a certain amount of liquid thus flows to the scum collecting devices 31 or 32 provided for the purpose.

As already mentioned, the sand filter 8 is gradually clogged with accumulating impurities. It must therefore be cleaned from time to time. According to the invention it is made possible for the necessary cleaning operation to be combined with the separation of the surface scum. The moments at which the sand filter is cleaned and the surface scum removed are determined by the programme control means in the control device 25. Thorugh the command cable 28 the control device then transmits a command to the valve 21, so that communication between the pipes 19 and 20 is interrupted and communication is made between the pressure pipe 22 and the pipe 19. At the same time a command is transmitted through the cable 29 to the pressure generating device, which as already mentioned may be a pump, which then starts up. The pressure generating device thus forces water through the pipes 22 and 19 back into the pure water sump 9 and from the latter through the small openings 11 into the filter bed 10 and up thorugh the sand filter 8, which is thereby freed from the accumulated impurities.

Since water is forced through the sand filter 8, the liquid level 26 rises rapidly. Although this takes place relatively quickly, no undesired flows or turbulence occur in the flotation part which could destroy the flotation process. This is due to the fact that the entire amount of liquid contained in the flotation part is uniformly raised over its complete surface. In this manner a considerable raising of the liquid level is achieved rapidly and without harmful flows, thereby permitting very effective removal of the upper layer since the latter, together with the scum accumulated on the surface, can run off into the scum collectors provided for the purpose.

Because of the manner in which the surface scum is separated in accordance with the invention, the scum entrains a certain amount of liquid, or more correctly, the scum carries a certain amount of liquid to the scum collectors. This liquid, can, however, be subjected to coarse purification in a sedimentation plant or by means of a filter, after which the liquid can be returned to the soiled water which is to be purified.

The pipes both in the lower layer 40 and in the upper layer 41 normally contain a gas-liquid mixture under relatively high pressure, the gas, which consists mainly of air, being dissolved in the liquid, which advantageously consists of pure water.

When the gas-liquid mixture 43 leaves the pipes through the openings 42, the pressure energy is converted into kinetic energy, so that the mixture flows out at a moderate speed. The speed is illustrated in FIGURE 2 by arrows. Gradually, however, the speed decreases, the dissolved gases changing into small bubbles, which are mainly formed on the flakes situated in the basin 7, adhering to them, so that said flakes are raised by buoyancy to the surface. The substances which cannot be floated, or can be floated only with very great difficulty, sink on the other hand downwards to the sand filter. On passing through the bed of pipes (the pipes 40, 41) the substances moving downwards are however exposed to the intense liquid flow from the openings 42, whereby sedimentation is made difficult. Actually, the entire upper layer of the sand filter is treated by the gas-liquid mixture flowing out, whereby the impurities collecting in the upper layer are enabled by the movement resulting from the flow to penetrate more deeply into the sand layer. This is particularly the case if the pipes 40 are disposed somewhat lower than illustrated in the drawings. Through the movement it is also possible for substances which are less suitable for flotation and which readily tend to settle to entrain flakes which are floated to the surface.

In some circumstances, for example when the pipes 40 are completely covered by sediment, it is also possible for the pressure in the pipes to be considerably increased in order thereby to bring about a violent movement, whereby the passage of water through the filter is restored.

Within the scope of the invention it is possible for a number of additions to and modifications of the devices illustrated to be made. Thus for example the control and regulating devices are indicated only diagrammatically.

These details can easily be completed by a specialist with the aid of basic principles which are generally known in control technique. In addition, the spray devices for the gas-liquid mixture may, for example, be given a form different from that comprising pipes. Moreover, they may be disposed differently from the arrangement shown in the drawings. For example, the bottom layer may be disposed considerably lower, in order thereby to obtain a more violent movement of the surface. It is also possible for the spray devices to be disposed in more than two layers, one layer, preferably the bottom layer, being for example operated intermittently, that is to say these pipes being placed under pressure only at prearranged times.

We claim:

1. Apparatus for the purification of an impure liquid comprising a flotation basin, a granular filter forming the bottom of said basin, means for introducing impure liquid to said flotation basin, means for subjecting said impure liquid to gaseous flotation therein as it passes through said basin before passing outwardly through said granular filter for final purification, means for periodically reversing the flow of liquid through said granular filter to remove accumulated sedimentation from said filter and to cause the level of liquid in said flotation basin to rise whereby floating impurities can be removed therefrom.

2. Apparatus as claimed in claim 1 and further comprising a perforated plate for supporting the granular filter and a sump below said perforated plate.

3. Apparatus as claimed in claim 1 and further comprising means disposed adjacent the upper surface of said granular filter and the lower portion of said flotation basin for injecting a liquid containing a dissolved gas under pressure for effecting the initial flotation purification of said impure liquid.

4. Apparatus as claimed in claim 3, wherein said liquid injecting means comprises a plurality of inlets arranged substantially in at least two horizontal levels, the pluraltiy of inlets in said upper level being located above said granular filter.

5. Apparatus as claimed in claim 4, wherein the plurality of inlets in said lower level are immediately adjacent the upper surface of said granular filter whereby the liquid containing dissolved gas injected by said lower level inlets agitates the upper surface of said granular filter to prevent accumulation of sediment thereon while causing gaseous flotation of said impure liquid.

6. Apparatus as claimed in claim 5 in which said lower level inlets are disposed within the upper surface of said granular filter, and further comprising means for periodically injecting liquid containing dissolved gas from said lower level inlets to disturb the upper surface of said granular filter to eliminate settling of sediment thereon.

References Cited

UNITED STATES PATENTS

| | | | |
|---|---|---|---|
| 1,638,977 | 8/1927 | Avery | 210—44 |
| 2,948,400 | 8/1960 | Hagen | 210—265 X |
| 3,053,761 | 9/1962 | Bradt | 210—44 |
| 3,239,438 | 3/1966 | Voorhees | 210—44 X |
| 3,314,880 | 4/1967 | Rubin | 210—44 |

REUBEN FRIEDMAN, *Primary Examiner.*

J. L. DE CESARE, *Assistant Examiner.*

U.S. Cl. X.R.

210—221, 265, 275